United States Patent [19]

Kinugasa et al.

[11] Patent Number: 4,745,480
[45] Date of Patent: May 17, 1988

[54] SOLID-STATE IMAGE PICK-UP DEVICE HAVING AN ARRANGEMENT TO AVOID ADVERSE EFFECTS ON THE WAVEFORM OF PICTURE ELEMENTS SIGNAL BY THE READ-OUT START PULSE

[75] Inventors: Toshiro Kinugasa; Takuya Imaide; Iwao Aizawa, all of Yokohama, Japan

[73] Assignee: Hitachi, Ltd., Tokyo, Japan

[21] Appl. No.: 886,225

[22] Filed: Jul. 16, 1986

[30] Foreign Application Priority Data

Jul. 19, 1985 [JP] Japan .................................. 60-159784

[51] Int. Cl.$^4$ ............................................. H04N 3/14
[52] U.S. Cl. ............................ 358/213.18; 358/213.15
[58] Field of Search ....................... 358/213.15, 213.18, 358/213.31; 357/30 G

[56] References Cited

U.S. PATENT DOCUMENTS

| | | | |
|---|---|---|---|
| 3,555,180 | 1/1971 | Cook | 358/213.15 |
| 3,919,469 | 11/1975 | Kasperkovitz | 358/213.15 |
| 4,434,441 | 2/1984 | Ishizaki et al. | 358/213.31 |
| 4,577,232 | 3/1986 | Hynecek | 358/213.15 |
| 4,607,286 | 8/1986 | Weimer | 358/213.15 |

Primary Examiner—Jin F. Ng
Assistant Examiner—Stephen Brinich
Attorney, Agent, or Firm—Antonelli, Terry & Wands

[57] ABSTRACT

A solid-state image pick-up device is provided which will not have a waveform of the picture element signals adversely influenced by a start pulse of the read out. The device includes photoelectric converting elements arranged in a two dimensional array and a shift register for generating horizontal scan pulses in response to a start pulse and clock pulses. The scan pulses are provided to means for sequentially reading out picture element signals from the photoelectric converting elements. A clock pulse generator responsive to the start pulse is also provided which generates clock pulses to the shift register after a lapse of a predetermined period following the start pulse. The period is selected to avoid an adverse influence on the waveform of the picture element signals by the start pulse.

9 Claims, 6 Drawing Sheets

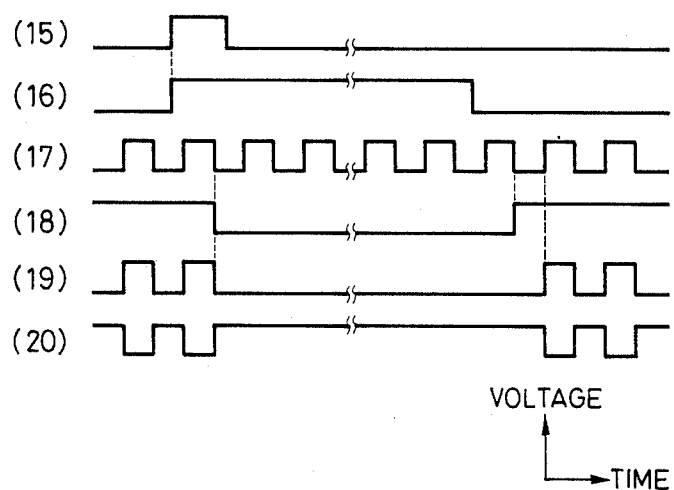

SOLID-STATE IMAGE PICK-UP DEVICE HAVING AN ARRANGEMENT TO AVOID ADVERSE EFFECTS ON THE WAVEFORM OF PICTURE ELEMENTS SIGNAL BY THE READ-OUT START PULSE

BACKGROUND OF THE INVENTION

This invention relats to a solid-state image pick-up device. More particularly, it relates to a solid-state image pick-up device which has an improvement in signal waveforms read out from a solid-state image sensor.

Solid-state video cameras using solid-state image pick-up devices are being developed and marketed at an accelerated speed according to the progress of semiconductor techniques. In comparison with image pickup tube type video cameras, the solid-state video cameras have many advantages. For example, they (1) more suitable for mass production, (2) free of image logs and stickings (3) and strong against a magnetic field.

Metal Oxide Semiconductor type (hereinafter MOS type) image pick-up devices are well known in the prior art and discussed in detail, for example, in Fujita et al, "Development of Color Solid-state Image Sensors", Technical Report of the Institute of Television Engineers of Japan, ED585, IPD59-23, June 1981, K. Sato et al, U.S. Pat. No. 4,245,241, issued on Jan. 13, 1981, and so on.

In the MOS type image sensor, MAS switches which are arranged in a matrix are sequentially turned on and off by a scan circuit consisting of a horizontal shift register and a vertical shift register to read out a picture element signal. Therefore, it has freedom with regard to the method of reading the picture element signals. On the contrary, it involves problems attributable to scan pulses which drive the scan circuit, especially horizontal scan pulses.

Hereinafter, the just-mentioned problems will be explained in detail by the use of drawings. FIGS. 1 to 3 illustrate the structure of the MOS type image sensor, the circuit diagram of a horizontal scan circuit (a shift register) shown in FIG. 1, and a time chart of primary signals of the horizontal scan circuit, respectively.

In FIG. 1, the numerals 50, 52, 54, 56, 58, 60 and 62 denote a horizontal scan circuit, a vertical scan circuit, horizontal signal lines, vertical signal lines, switching MOS (hereinafter, S. MOS), an interlace gate line, and a picture element, respectively.

Further, in FIGS. 2 and 3, $\phi$IN designates a start pulse for the horizontal scan circuit, and $\phi_1$ and $\phi_2$ denote clock pulses for the horizontal scan circuit. Time charts of FIG. 3 illustrate ones of signals at points $N_1$ to $N_7$ shown in FIG. 2. The output lines of the circuit shown in FIG. 2 are drawn out respectively from the points $N_4$, $N_8$, $N_{12}$..., although only one output line 64 from the point $N_4$ is shown as a representative.

In the circuit of FIG. 2, the horizontal scan circuit starts operation, when a high level state of the start pulse $\phi$IN overlaps a high level state of the clock $\phi_1$, so that it sequentially produces a train of pulses Ni (i=4, 8, 12...) as shown in FIG. 2 through the output lines. The signals of the picture elements are sequentially read out by this pulse train Ni, which will be hereinafter referred to as "read-out pulses or scan pulses."

Namely, when the frequency of the clock pulses $\phi_1$ is f, the readout pulses appear on the output lines in order to start the read out of the picture element signals after inputting the start pulse $\phi$IN with a delay of 1/f which is equal to one clock period of the clock pulses $\phi_1$. In this instance, considering the high speed of the clock pulses $\phi_1$, e.g., f=7.2 MHz in the above-mentioned prior art, it is assumed that the reading of the picture element signals is started immediately after inputting the start pulse $\phi$IN.

Accordingly, as soon as the horizontal scan circuit 50 begins to produce the scan pulses $N_4$, $N_8$, and so forth, the start pulse $\phi$IN jumps into the picture element signals through the image sensor or a wiring pattern on a board which mounts the image sensor, and overlaps a ringing waveform onto the picture element signals. As a result, quality of the picture image reproduced on a monitor screen is deteriorated to a considerable degree. Further, in a case where an optical block for a black reference is provided by shutting off a light from a certain number (several or several tens) of picture elements from the start point of the read-out, there arises a problem that a black balance is deviated by the jump of the start pulse $\phi$IN.

SUMMARY OF THE INVENTION

It is an object of the present invention to provide a solid-state image pick-up device which can eliminate the above-mentioned drawbacks of the prior art, and in which a waveform of a picture element signal is not influenced by a start pulse during reading out the picture element signal from a solid-state image sensor.

It is another object of the invention to provide a MOS type solid-state image pick-up device which has no influence to a picture element signal and a black reference by a start pulse.

Briefly, according to the present invention, the read-out of the picture element signals is started after a lapse of a period, on which the start pulse has an influence on the waveform of the picture element signal, by controlling the phase of the start pulse as well as the phase of the read-out pulses which determine the timing of starting the read-out of thepicture element signals.

BRIEF DESCRIPTION OF THE DRAWINGS

FIG. 10 illustrates a time chart of primary signals of the generator shown in FIG. 9.

DETAILED DESCRIPTION OF THE PREFERRED EMBODIMENTS

The present invention will be explained by way of a number of embodiments. The first embodiment of the invention is shown in a block diagram of FIG. 4.

Figure 1:
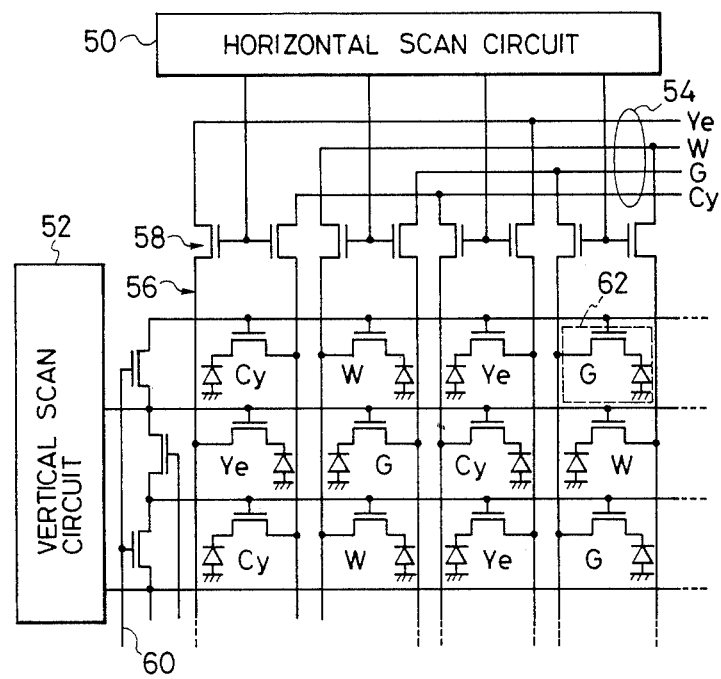
FIG. 1 shows a circuit diagram of a MOS type image sensor in the prior art.
Figure 4:
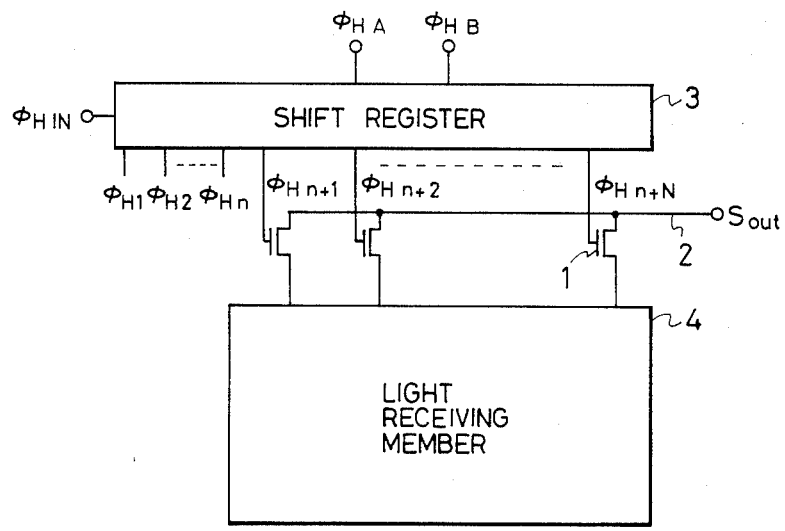
FIG. 4 shows a block diagram of an embodiment of a solid-state image sensor of the present invention.

In FIG. 4, the numerals 1, 2, 3 and 4 denote a S-MOS, a horizontal signal line, a shift register and a light receiving member (a photoelectric conversion part), respectively. The light receiving member 4 includes at least a group of photoelectric converting elements arranged in a two dimensional array as shown in FIG. 1.

Figure 2:
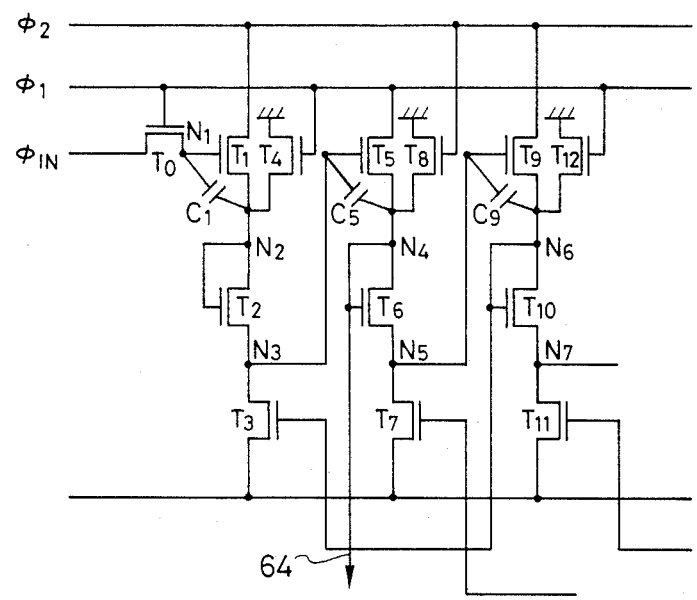
FIG. 2 shows a circuit diagram of a horizontal scan circuit (a shift register) shown in FIG. 1.
Figure 3:
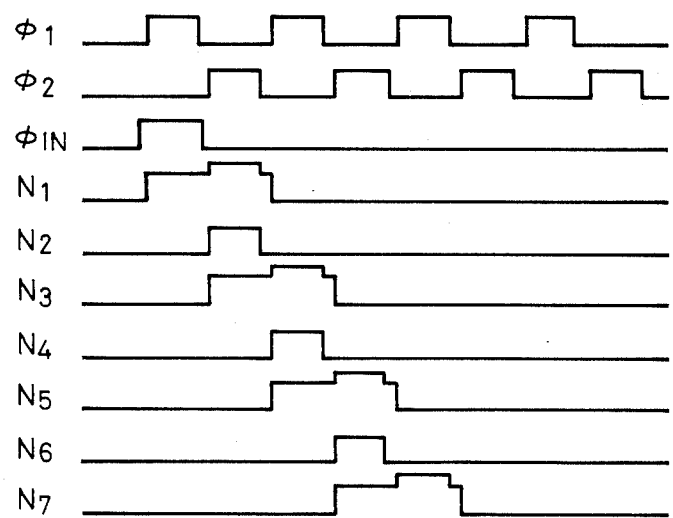
FIG. 3 illustrates a time chart of primary signals of the horizontal scan circuit shown in FIG. 2.

In this embodiment, the shift register 3 is provided with shift stages of the number (n+N), where n is an integer and N is a number which is necessary for turning on and off all of the S-MOSes 1 for each row of the photoelectric converting elements arranged in the two dimensional array. In order to read out the picture element signals from the light receiving member 4, read-out pulses $\phi_{Hn+1}$, $\phi_{Hn+2}$, ..., $\phi_{Hn+N}$ provided from the shift register 3 are used. In this instance, $\phi_{HIN}$, $\phi_{HA}$ and $\phi_{HB}$ indicate a start pulse and clock pulses, which correspond to the pulses $\phi_{IN}$, $\phi_1$ and $\phi_2$ shown in FIG. 2, respectively.

Figure 5:
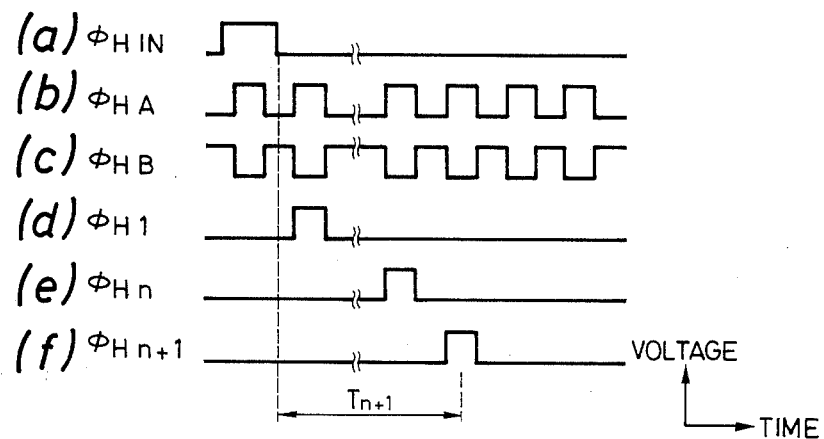
FIG. 5 illustrates a time chart of primary signals of the solid-state image sensor shown in FIG. 4.

The operation of the embodiment with the above-described construction is now explained with reference to the time charts of FIGS. 5 and 6. FIG. 5 is a time chart of signals in main parts of FIG. 4, while FIG. 6 is a diagram for explaining the influence of the start pulse $\phi_{HIN}$ on the picture element signals read out from the light receiving member 4.

The train of the output pulses $\phi_{Hi}$ where i=1, 2, ..., n, n+1, ..., n+H (corresponding to Nj of the conventional example where j=4, 8, 12, ...) is sequentially produced by the shift register 3 as shown in FIG. 5 after the start pulse $\phi_{HIN}$ turning to the high level. At this time, the phase difference $T_{n+1}$ between the start pulse $\phi_{HIN}$ and the high level period of the read-out pulse $\phi_{Hn+1}$, which determines the read-out timing, is controlled to be greater than an influential period ($T_{TR}$) of $\phi_{HIN}$ as shown in FIG. 6. Namely, it is selected that $T_{n+1} < T_{TR}$.

Figure 6:
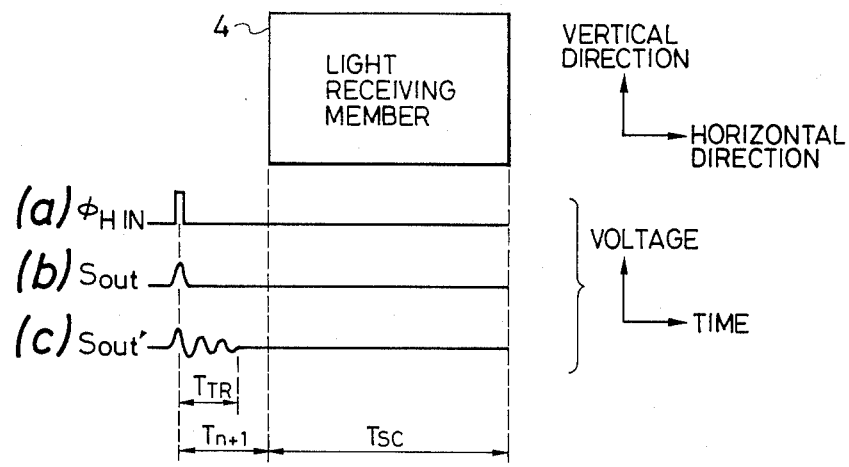
FIG. 6 illustrates a time chart of output signals from the solid-state image sensor shown in FIG. 4.

In this embodiment, by the lapse $T_{n+1}$ after the start pulse $\phi_{HIN}$ turning to the high level, the picture element signals are read out from the light receiving member 4 through the horizontal signal line 2 within a time period Tsc as shown in FIG. 6. Therefore, the start pulse $\phi_{HIN}$ jumps into an output signal Sout of the solid-state image sensor shown in FIG. 6 and a ringing waveform is overlapped on an signal S'out, which is output from a succeeding signal processing stage.

However, in the present embodiment, since the condition of $T_{n+1} > T_{TR}$ is satisfied as explained hereinbefore, there is no possibility that the starting pulse $\phi_{HIN}$ adversely affects the read-out picture element signals and impairs quality of a video image which is reproduced on a screen. Preferably, the period $T_{n+1}$ should be set to be at least two times longer than the period of the read-out pulses, that is, the scan pulses provided fromt he shift register 3.

According to the this embodiment, the object of the present invention can be achieved simply by increasing the number of shift stages of the shift register 3 from the number n to the number n+N without broadening the area of the light receiving member 4. The former can be densified relatively easily. In contrast, the latter has a great influence on the yield of the solid-state image sensor.

Figure 7:
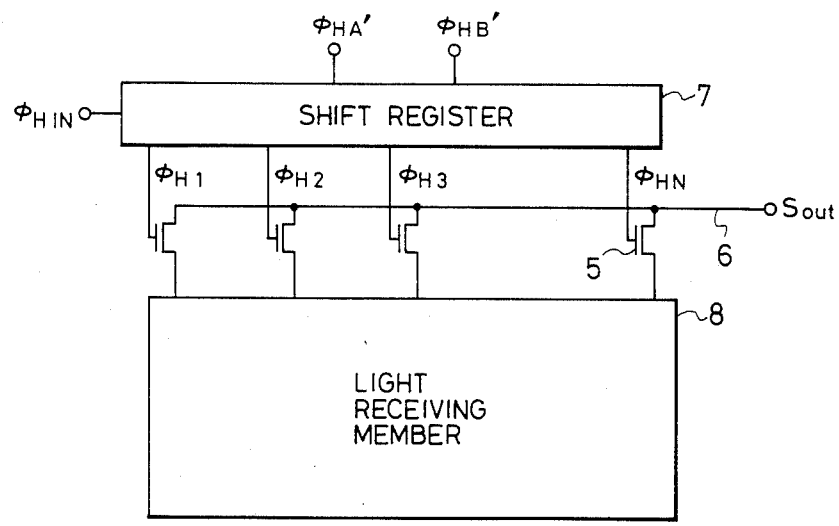
FIG. 7 shows a block diagram of another embodiment of a solid-state image sensor of the present invention.
Figure 8:
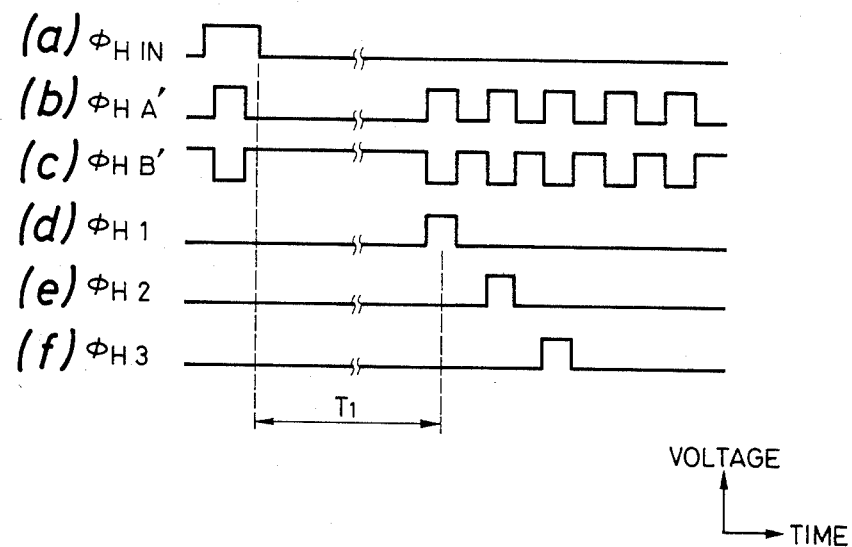
FIG. 8 illustrates a time chart of primary signals of the solid-state image sensor shown in FIG. 7.

FIGS. 7 and 8 show the second embodiment of the present invention, which concerns the driving system of the solid-state image sensor. FIG. 7 is a diagrammatic view of a solid-state image sensor and FIG. 8 illustrates a drive time chart.

Referring to FIG. 7, the numerals 5, 6, 7 and 8 denote a S-MOS, a horizontal signal line, a shift register, a light receiving member. In this embodiment, the shift register 7 is arranged to have a number of stages equal to the number N, which is necessary for turning on and off all of S-MOSes 5.

In this embodiment, the clock pulses $\phi_{HA}'$ and $\phi_{HB}'$ which drive the shift register 7 are interrupted for a certain time period after the high level of the start pulse $\phi_{HIN}$ as shown in FIG. 8. Namely, the phase difference $T_1$ between the high level of $\phi_{HIN}$ and the high level of the read-out pulse $\phi_{H1}$, in response to which the read-out is started, is made greater than the influential period $T_{TR}$ of the start signal $\phi_{HIN}$, that is, $T_1 \geq T_{TR}$.

Referring to FIG. 7, the picture element signals which are read out from the light receiving member 8 through the S-MOSes 5 and the horizontal signal line 6 are exempted from the influence of the start pulse $\phi_{HIN}$ is such a manner as the first embodiment. In this case, the object of the present invention can be achieved without increasing the number of stages of the shift register 7.

Figure 9:
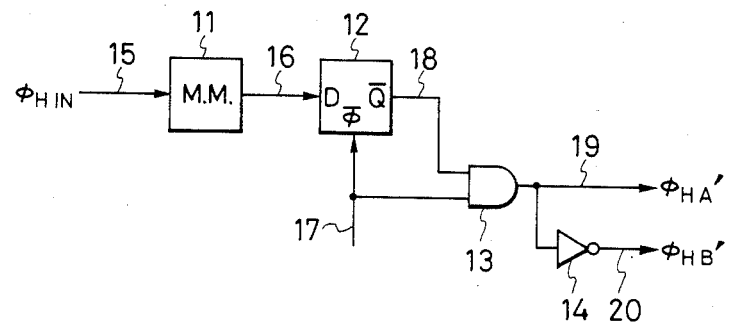
FIG. 9 shows a circuit diagram of an embodiment of a clock pulse generator used in the sensor shown in FIG. 7.

FIG. 9 shows an example of the circuit for generating the clock pulses $\phi_{HA}'$ and $\phi_{HB}'$ of FIG. 8. Referring to FIG. 9, the numberals 11, 12, 13 and 14 designate a monostable multivibrator (M.M.), a data type flip-flop (D-F.F.), an AND circuit and an inverter circuit, respectively. The numerals 15 to 20 designate the signals of the main parts of the circuit shown in FIG. 9, the waveforms of which are illustrated in FIG. 10.

The numerals 15 indicates the start pulse $\phi_{HIN}$, which is applied to the M.M.11 to obtain a pulse 16, a high level period of which corresponds to an interruption period for driving the shift register 7. The pulse 16 is applied to the D-F.F.12 as its data input, while clock pulses 17 corresponding to $\phi_{HA}$ of FIG. 5 is applied to the D-F.F.12 as its clock input. If the D-F.F.12 has a function for latching the data at the trailing edge of the clock pulses, its inverted output (Q) becomes the waveform 18 of FIG. 10.

Pulses 19 having the interuption period can be obtained by gating the clock pulses 17 with the inverted output pulse 18, and pulses 20 can be obtained by inverting the pulses 19 with the inverter circuit 14. These pulses 19 and 20 are used as $\phi_{HA}'$ and $\phi_{HB}'$.

According to the present invention, the output signal during the initial part of every horizontal scanning period is not influenced by the start pulse, so that the picture image having high quality can be obtained from the solid-state image sensor, effectively.

In the above-mentioned embodiment, although the simplest circuit construction having only one horizontal signal line has been explained, the present invention will be applied to another type of solid-state sensors, for example, the type having several horizontal signal lines as shown in FIG. 1. In general, the present invention can be applied to the type having a horizontal scan circuit for generating read-out pulses.

What is claimed is:
1. A solid-state image pick-up device, comprising:
   a group of photoelectric converting elements arranged in a two dimensional array;

means for sequentially reading out picture element signals from said photoelectric converting elements;

means for generating horizontal scan pulses in response to a start pulse of a read out; and means for controlling a phase difference between said start pulse and the first one of said horizontal scan pulses which are provided to said reading out means so as to provide said horizontal scan pulses to said read out means after a lapse of a predetermined period, said predetermined period being set so that said start pulse will not adversely influence a waveform of said picture element signals.

2. A solid-state image pick-up device according to claim 1, wherein said controlling means includes means for generating clock pulses in response to said start pulse, said clock pulses generating means generating said clock pulses supplied to said horizontal scan pulse generating means after said lapse from receiving said start pulse.

3. A solid-state image pick-up device according to claim 1, wherein said controlling means includes means within said horizontal scan pulse generating means for delivering said horizontal scan pulses from the (n+1)th pulse thereot to the said reading out means, and said (n+1)th pulse is delivered from said delivering means after said lapse from receiving said start pulse, where n is an integer.

4. A solid-state image pick-up device according to claim 3, wherein said horizontal scan pulse generating means includes a shift register having a number (n+N) of shift stages, the number N corresponds to a number of said picture element signals of each row of said array.

5. A solid-state image pick-up device, comprising:

a group of photoelectric converting elements arranged in a two dimensional array;

means for generating clock pulses in response to a start pulse, said clock pulses being generated after a lapse of a predetermined period;

means for generating horizontal scan pulses in response to said start pulse and said clock pulses; and means for sequentially reading out said picture element signal from said photoelectric converting elements in response to said horizontal scan pulses, wherein said predetermined period is set so that said start pulses will not adversely influence the read out of picture element signals from said photoelectric converting elements.

6. A solid-state image pick-up device according to claim 5, wherein said horizontal scan pulse generating means includes a shift register.

7. A solid-state image pick-up device, comprising:

a group of photoelectric converting elements arranged in a two dimensional array;

means for generating horizontal scan pulses in response to a start pulse and clock pulses, said generating means generating a number (n+N) of horizontal scan pulses, where n and N are integers, wherein the number N is equal to a number of said photoelectric converting elements at each row of said two dimensional array; and means for sequentially reading out picture element signals from said photoelectric converting elements of each row of said array in response to the latter N pulses of said horizontal scan pulses, wherein said number n is selected to delay the application of horizontal scan pulses to said reading out means for a predetermined period following said start pulse.

8. A solid-state image pick-up device according to claim 7, wherein said horizontal scanpulse generating means includes a shift resister having shift stages of the number (n+N).

9. A solid-state image pick-up device, comprising:

a group of photoelectric converting elements arranged in a two dimensional array;

means for generating horizontal scan pulses in response to a start pulse and clock pulses, said generating means generating a number (n+N) of horizontal scan pulses, where n and N are integers, and the number N is equal to a number of said photoelectric converting elements at each row of said two dimentional array; and means for sequentially reading out picture element signals from said photoelectric converting elements of each row of said array in response to the latter N pulses of said horizontal scan pulses, wherein the number n is selected so that said start pulse has no influence on a waveform of said picture element signal read out from said photoelectric converting elements.

* * * * *